Figure 1:
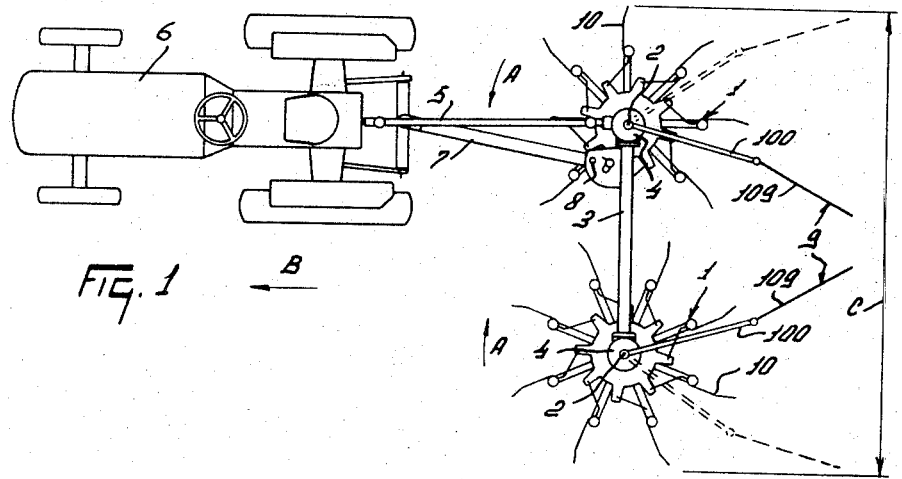

United States Patent [19]
Van Der Lely

[11] 3,841,073
[45] Oct. 15, 1974

[54] IMPLEMENTS FOR THE DISPLACEMENT OF CROP LYING ON THE GROUND

[76] Inventor: Cornelius Van Der Lely, 7, Bruschenrain, Zug, Switzerland

[22] Filed: Nov. 7, 1972

[21] Appl. No.: 304,382

[30] Foreign Application Priority Data
Nov. 9, 1971 Netherlands.................... 7115369
Nov. 26, 1971 Netherlands.................... 7116333
Dec. 2, 1971 Netherlands.................... 7116555

[52] U.S. Cl. ................................................ 56/370
[51] Int. Cl. ........................................... A01d 79/02
[58] Field of Search ............ 56/370, 376, 377, 366, 56/367

[56] References Cited
UNITED STATES PATENTS
3,559,389  2/1971  Van Der Lely et al............... 56/370
3,648,448  3/1972  Maugg.................................. 56/370
3,664,106  5/1972  Maugg.................................. 56/370

FOREIGN PATENTS OR APPLICATIONS
1,221,223  3/1971  Great Britain......................... 56/370

Primary Examiner—Antonio F. Guida
Attorney, Agent, or Firm—Mason, Mason & Albright

[57] ABSTRACT

A raking implement has at least one, preferably two, rotating rake wheels which are driven via a power takeoff to rotate about upwardly extending axes. Each rake wheel has radially extending arms, the ends of which have tines on supports pivotally connected to the arms. The tines are pivoted to move from one working position to another or a transport position in response to the torque of the driving connection so that one or more working positions can be achieved automatically during operation. The driving connection includes a geared hub connected through a coupling or directly to the tine supports and the tine supports can be movably associated or linked to the radial arms to rotate same after the tines and supports have been pivoted to another position. One or more stops and other adjusting means are employed to arrange and/or limit the positions of the tines and supports relative to the remainder of the rake wheel.

52 Claims, 22 Drawing Figures

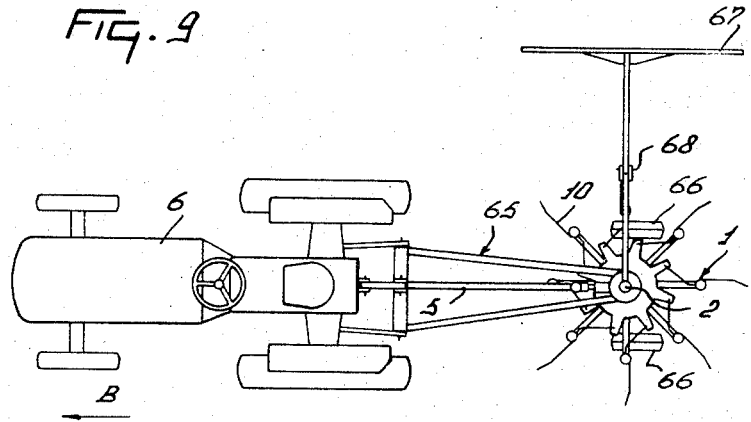
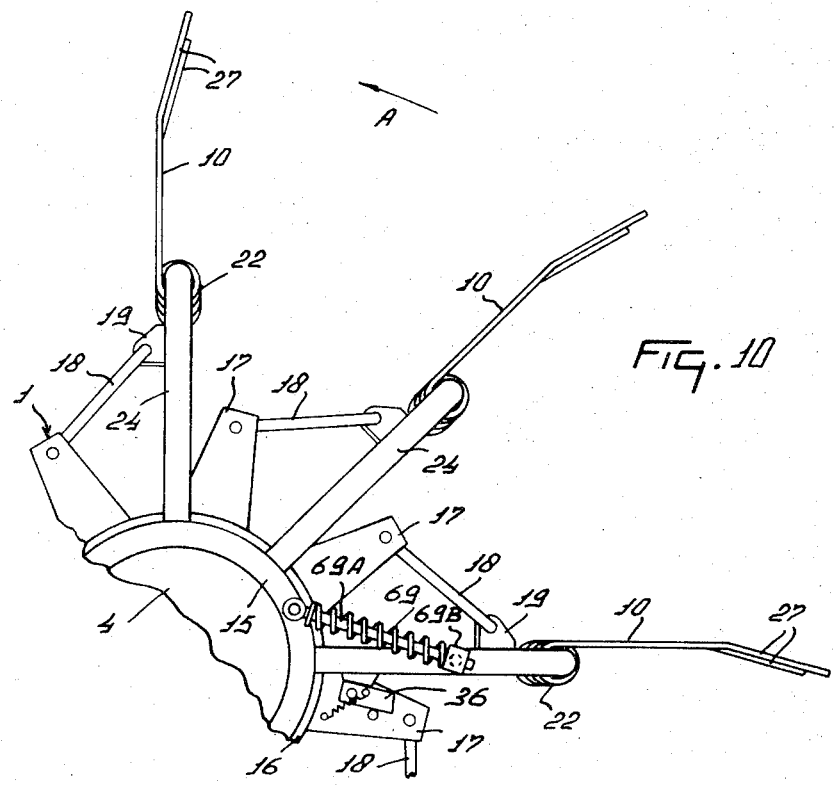

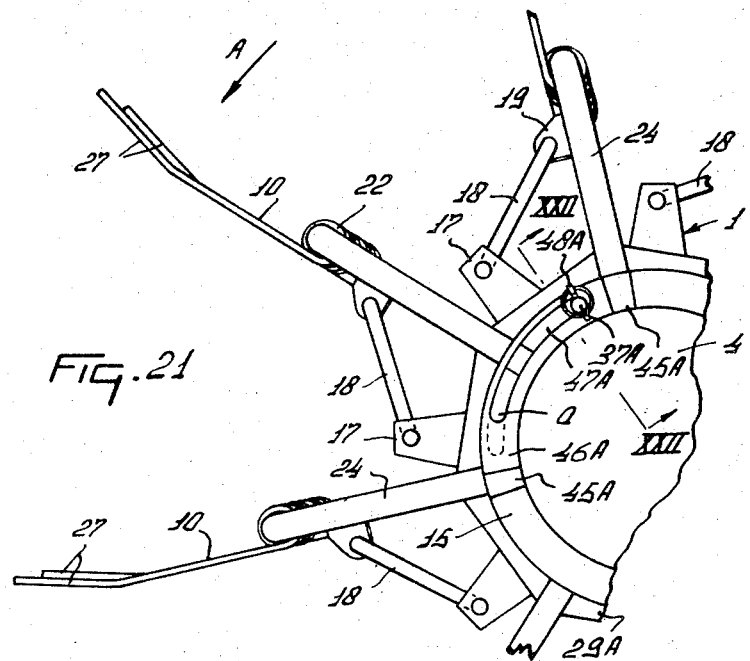
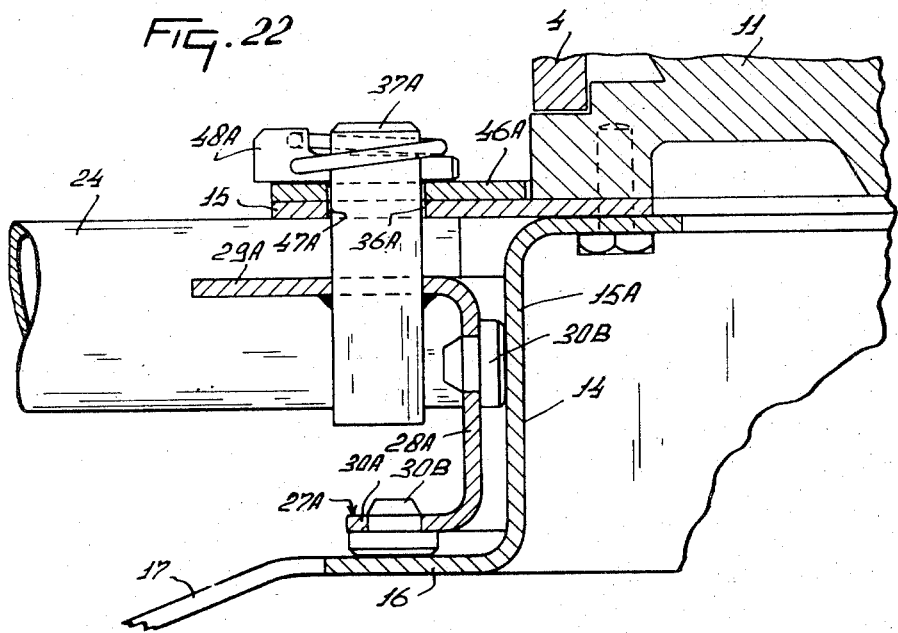

IMPLEMENTS FOR THE DISPLACEMENT OF CROP LYING ON THE GROUND

One object of the invention is to provide a different and improved construction to move the tines into their working positions.

According to one aspect of the invention, there is provided an implement of the kind set forth, wherein the tines are coupled with mechanical driving mechanism of the rake member and are arranged to be moved from one position into another by a torque exerted on the rake member at the commencement of its rotation.

Although the construction embodying the invention may be employed for adjusting the rake tines from one working position into a further working position, it is particularly important that, in accordance with the invention, the tines are movable from an inoperative transport position into a working position.

The invention is important for those implements which have a large working width, for example, hay making machines having rake members that are rotatable about upright axes, although the invention may also be applied to other hay making machines, for example, to drum tedders.

Although the invention may be applied to most rake members whose tines are displaced outwardly, the structure embodying the invention may be particularly successfully employed when the tines are arranged on the rake member so as to be swung about pivots. These pivots may, if desired, be substantially horizontal in the lowermost positions of the tines but, in an advantageous embodiment of the invention, said pivots are vertically or substantially vertically disposed in said positions.

In order to bring the tines from one position to the other, the rake member in one embodiment of the invention comprises two elements that are arranged around its axis of rotation and are coupled with the tines, the torque to start the rotation being exerted on one element so that the elements are relatively displaced and the tines are adjusted.

According to a further aspect of the invention the elements are arranged so as to be turnable relative to each other. An advantageous structure may be obtained by arranging the tines movably on one of the elements and by coupling them, in addition, with the other element. This may be carried out in various ways, bur preferably the connection is established by means of one or more coupling rods which are hinged to the elements or are otherwise pivotable relative thereto.

It has been found that, according to a further embodiment of the invention, it is advantageous if the rake member has means with the aid of which the movements of the elements relative to each other are limited. It appears that in this case the adjustment of the tines under heavy working conditions in practice is best ensured.

It is possible to arrange the coupling rods and the element driven by the torque above the element to which the tines are movably connected. However, it has been found to be advantageous to arrange the driven element and the coupling mechanism beneath the driving element or, with respect to the crop, at least behind this element so that there is only little risk of the crop getting into the mechanism and jamming it.

The rake member preferably comprises means for limiting the movement of the elements relative to each other so that the positions of the tines can be fixed. Said means may be formed by buffer springs, but at any rate by one or more stops.

It is often advantageous that the rake member should have not only a transport position and one working position but also a second working position. This second working position may be obtained in a simple manner, when the magnitude of the displacement of the elements relative to each other can be adjusted. In a further embodiment of the invention, the length of the movement of the elements relative to each other is adjustable so that the position of the tines is variable, there preferably being provided an adjustable stop for the adjustment of the various working positions of the tines.

In accordance with a further aspect of the invention the inertia forces are primarily utilised for moving the tines back into their initial positions. However, as an alternative, the tines may be moved back to their initial positions by means of springs or by their own weight.

The construction embodying the invention is particularly important for use in an implement comprising two or more rake members; however, it may also be applied to an implement comprising one rake member.

In accordance with a further aspect of the invention, the means for moving the tines from one position to another may, in addition, be used for a periodical displacement of the tines during each revolution. This construction may be especially important for use in machines comprising one rake member.

According to a further aspect of the invention, one of the elements is arranged eccentrically around the axis of rotation of the rake member and, during one revolution, it turns around said axis so that during the revolution the tines are displaced.

It has been found to be advantageous, in accordance with a further aspect of the invention, to provide a coupling for each tine, or each group of tines, with the other element. In this case the forces are advantageously distributed during the displacement of the tines.

Figure 2:
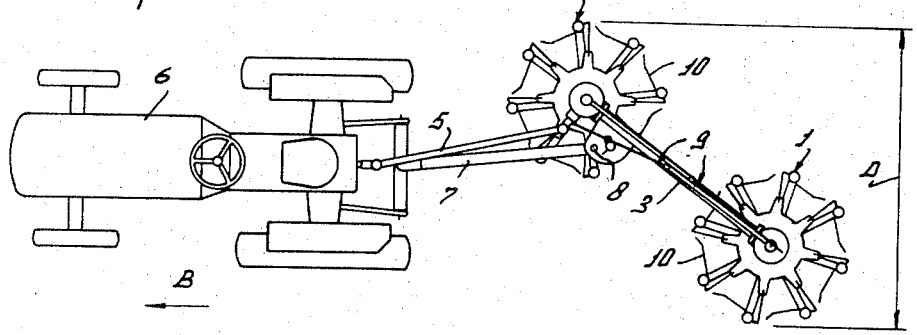
Figure 3:
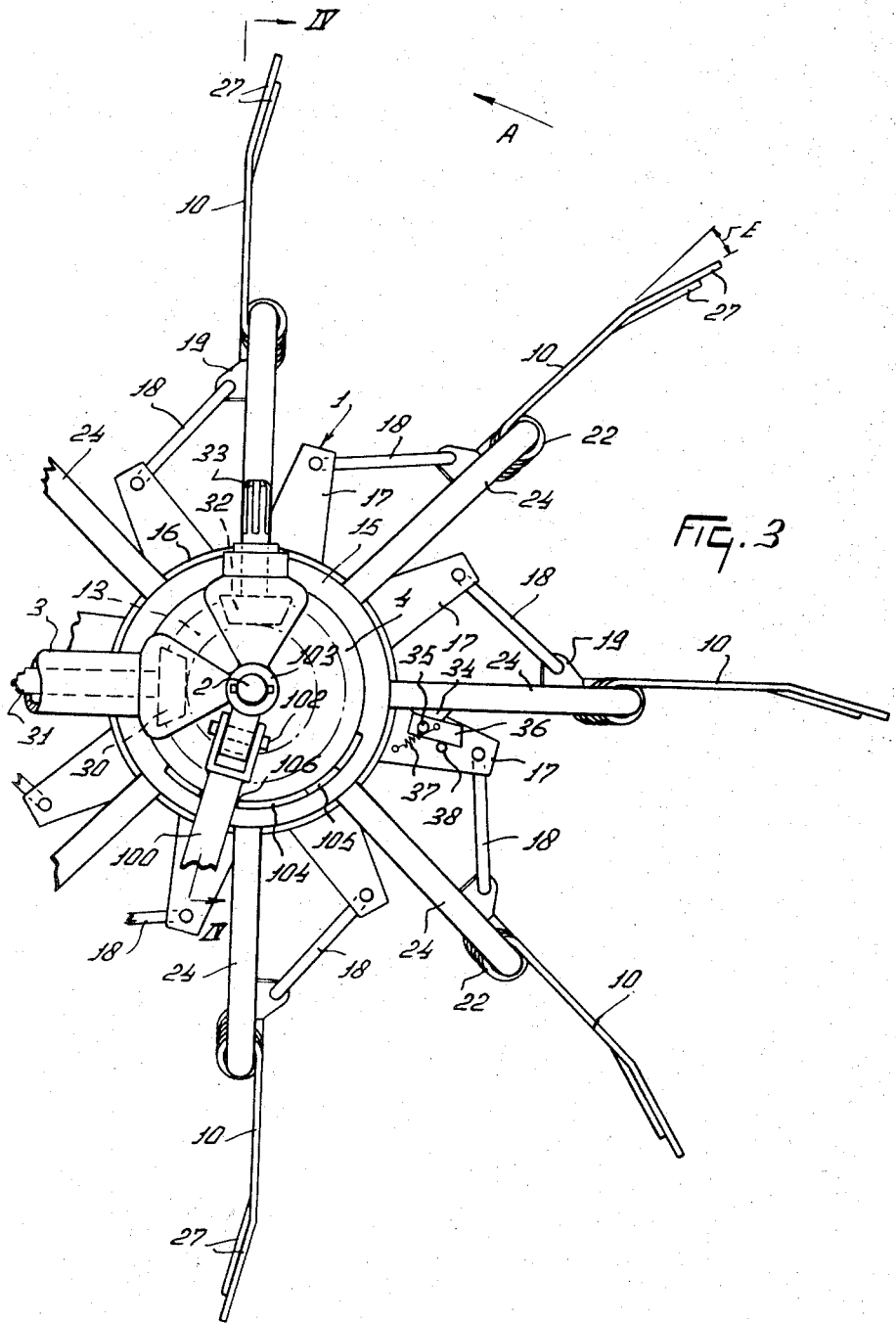
Figure 4:
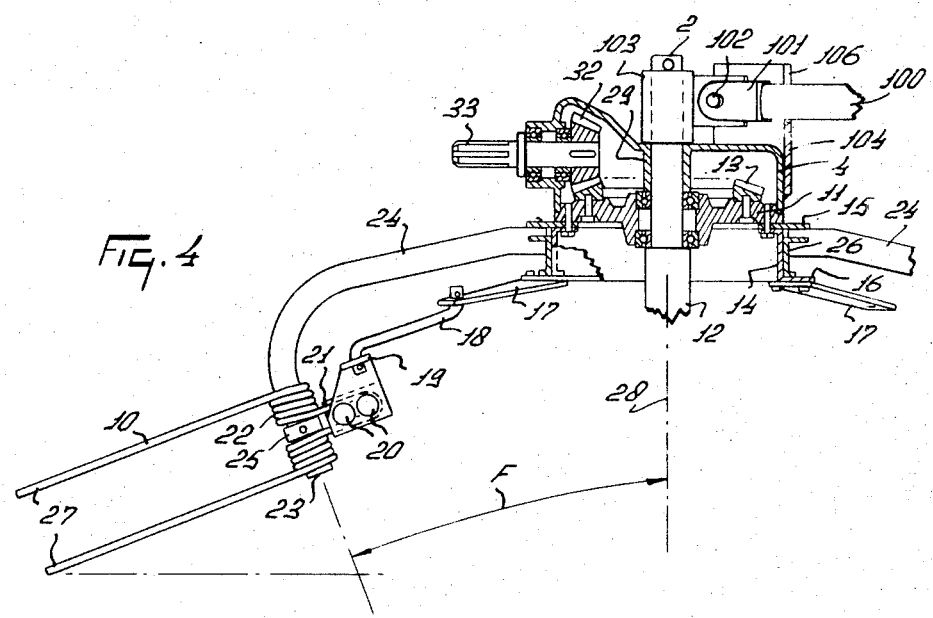
Figure 5:
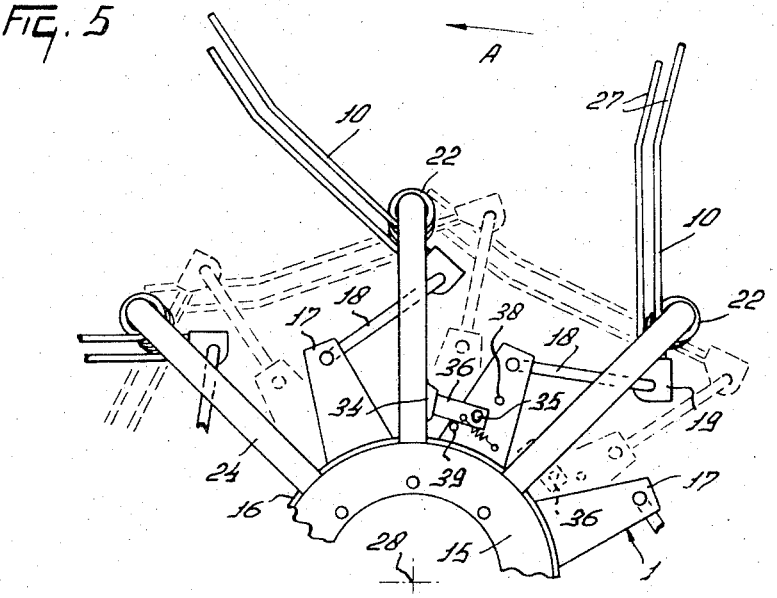
Figure 6:
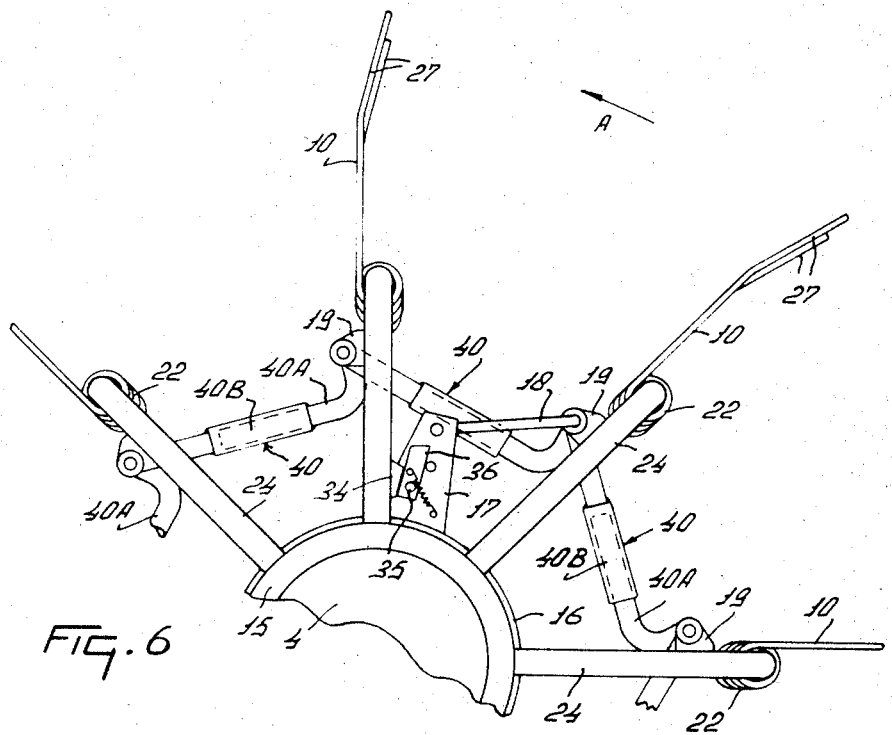
Figure 8:
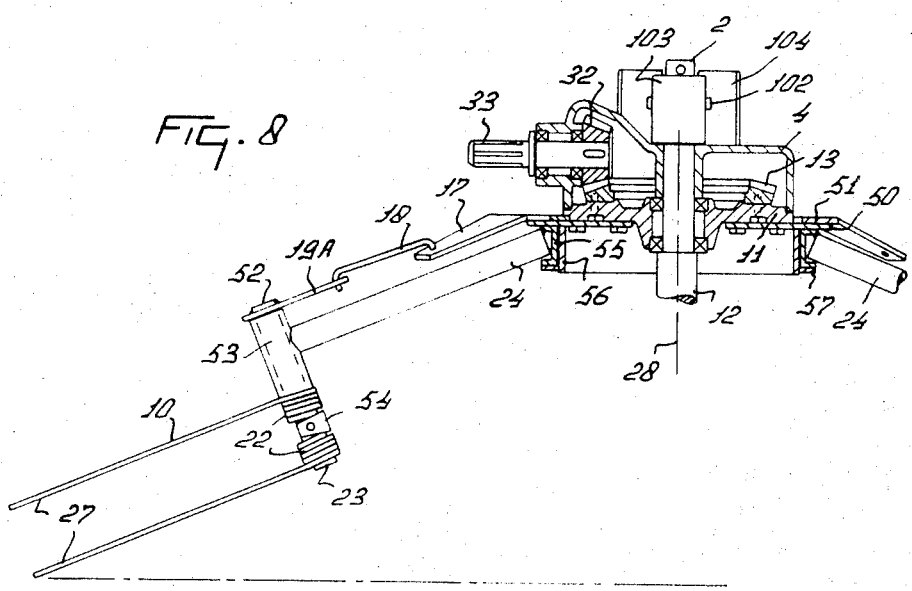
Figure 7:
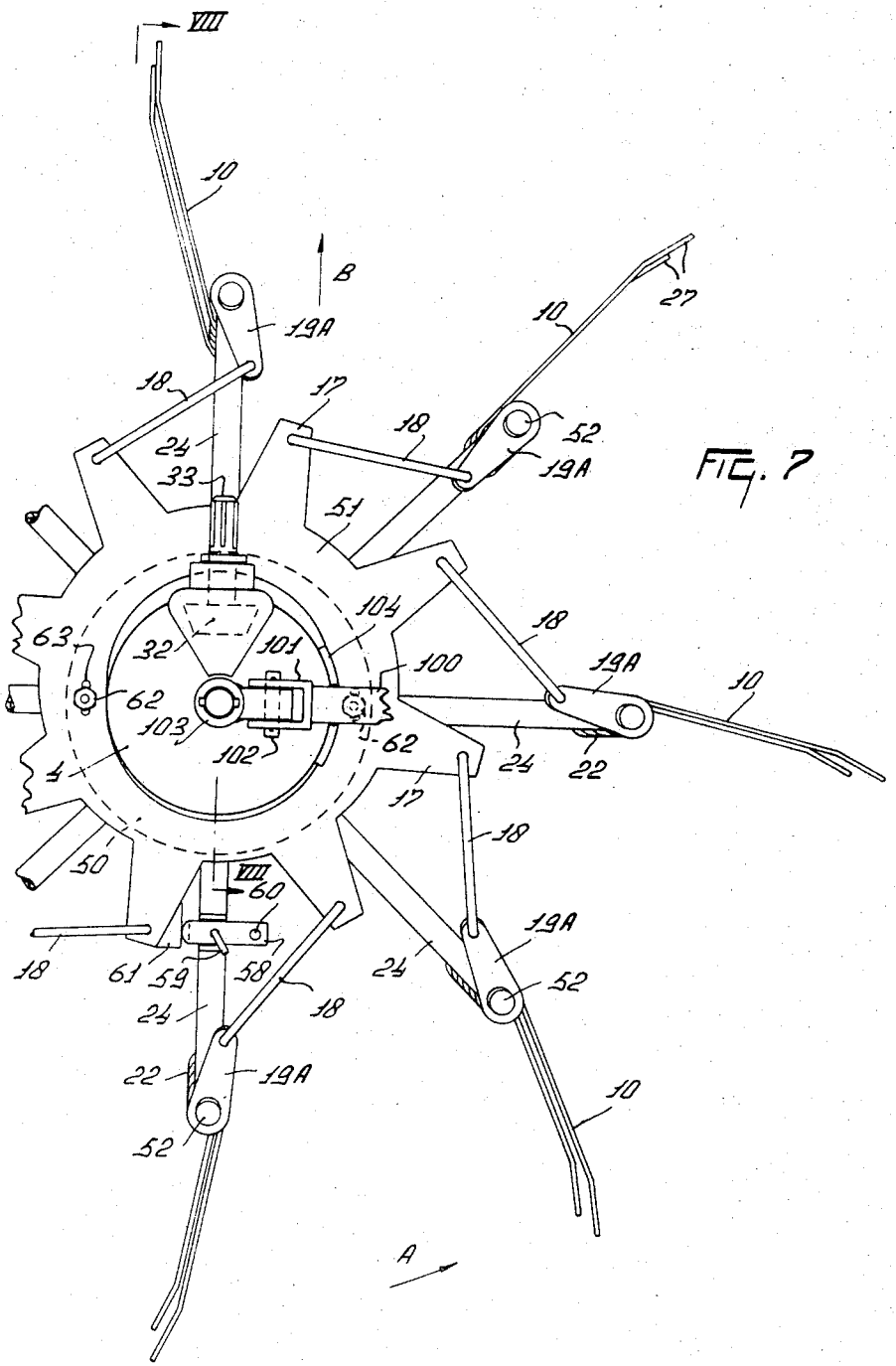
Figure 11:
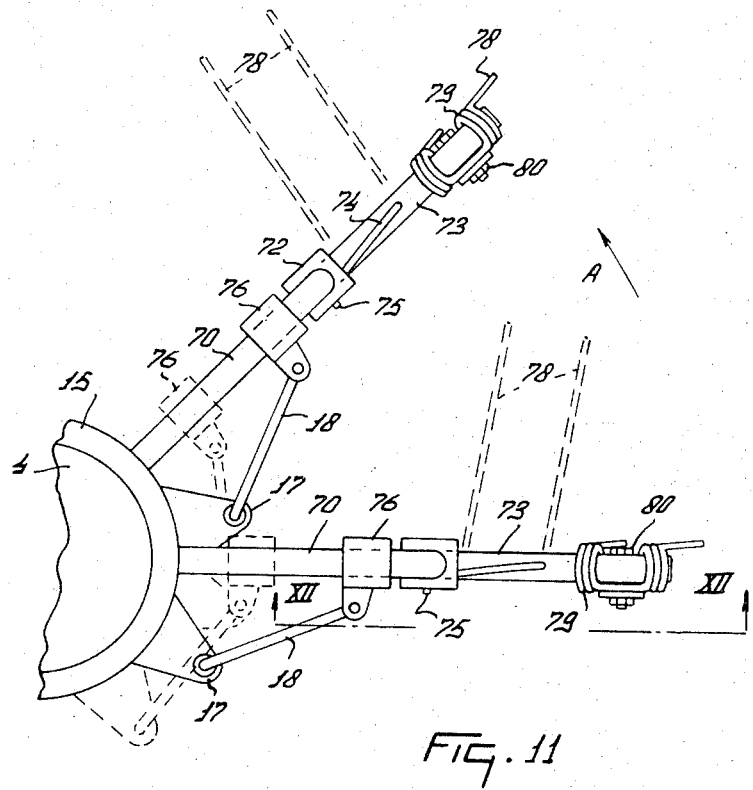
Figure 12:
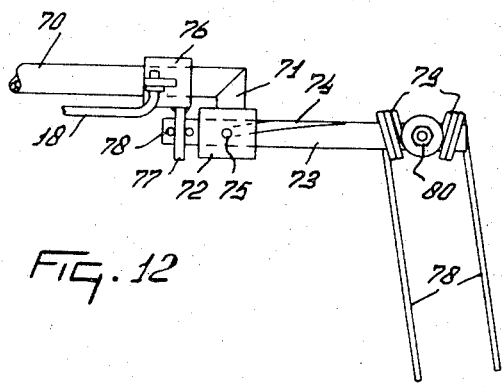
Figure 13:
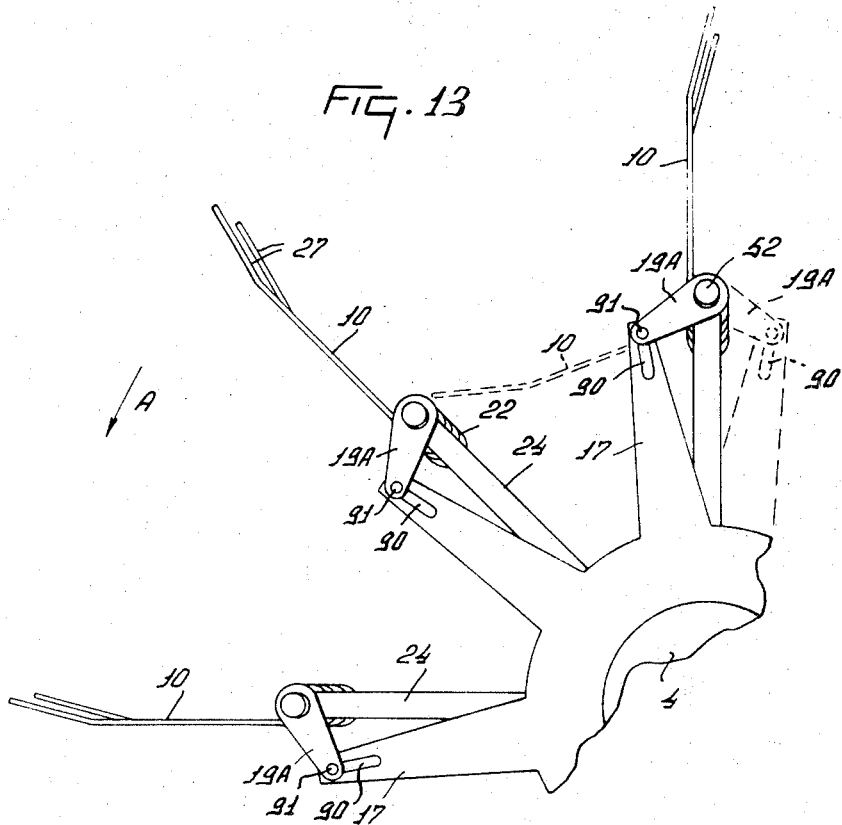
Figure 16:
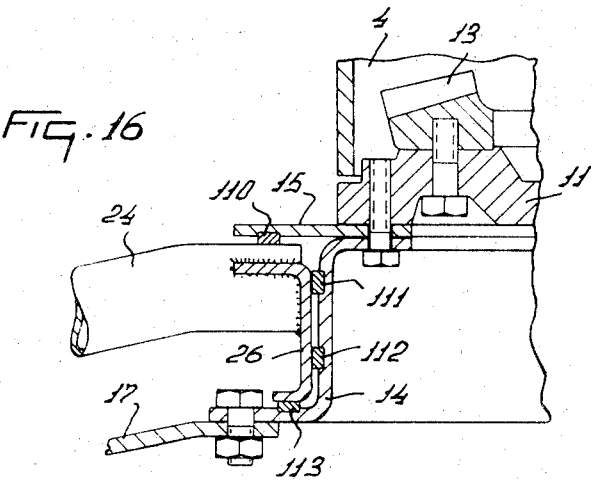
Figure 14:
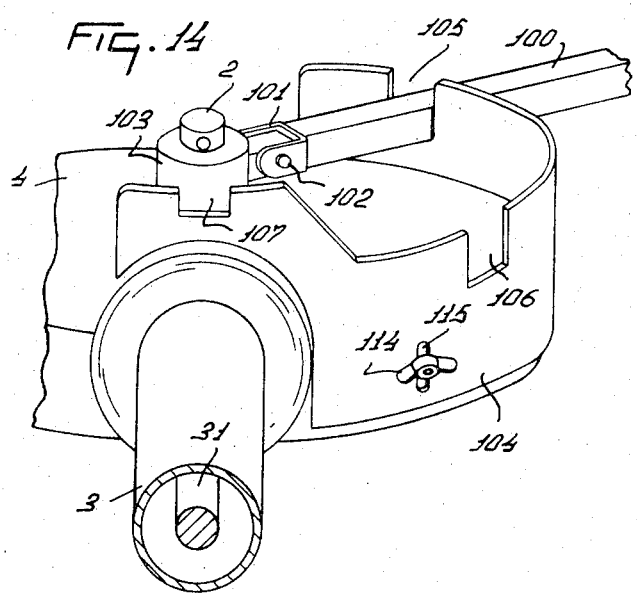
Figure 15:
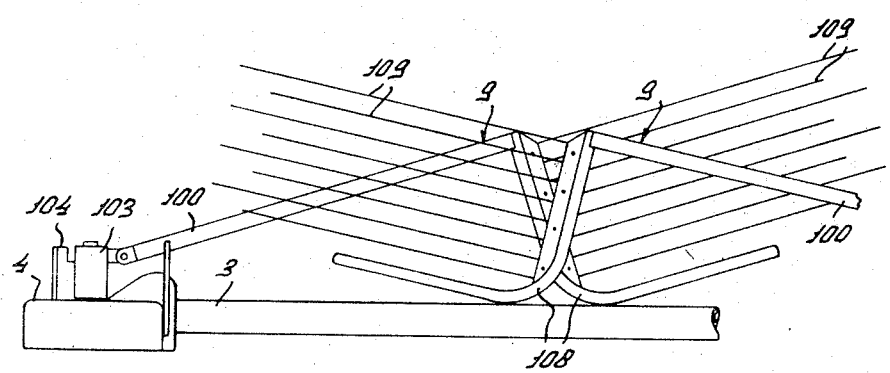
Figure 17:
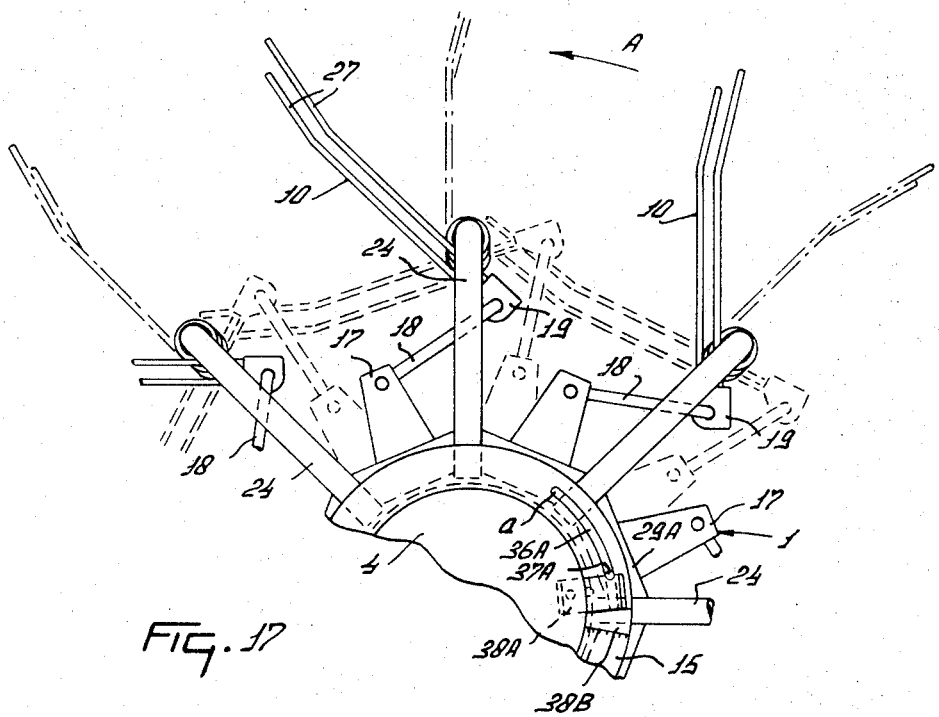
Figure 18:
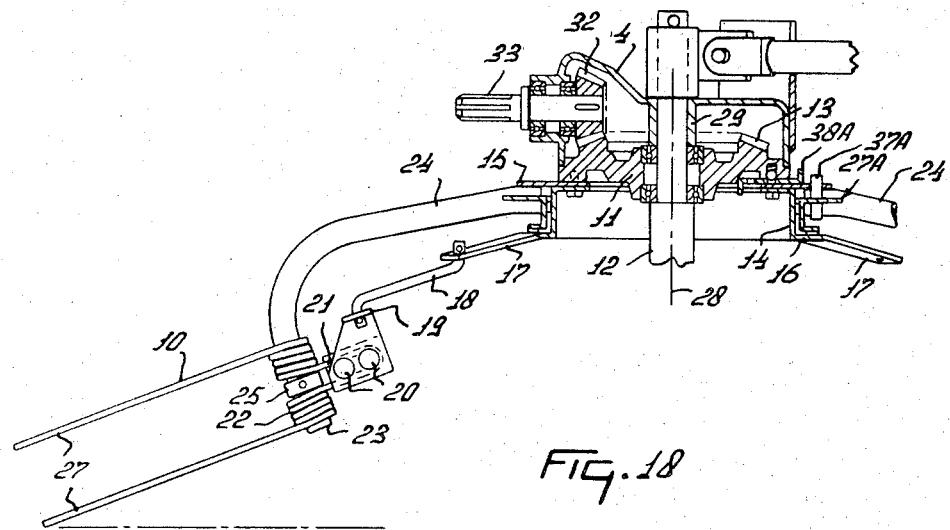
Figure 20:
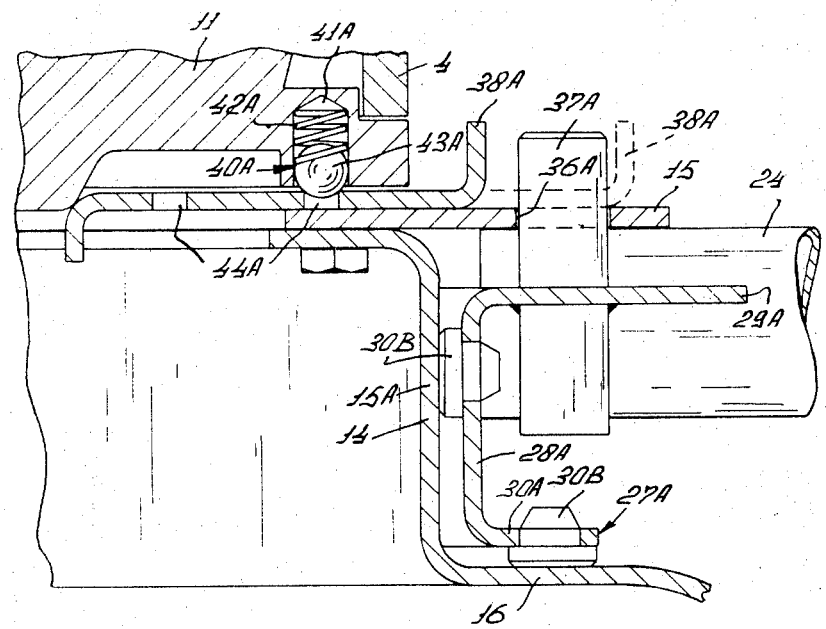
Figure 19:
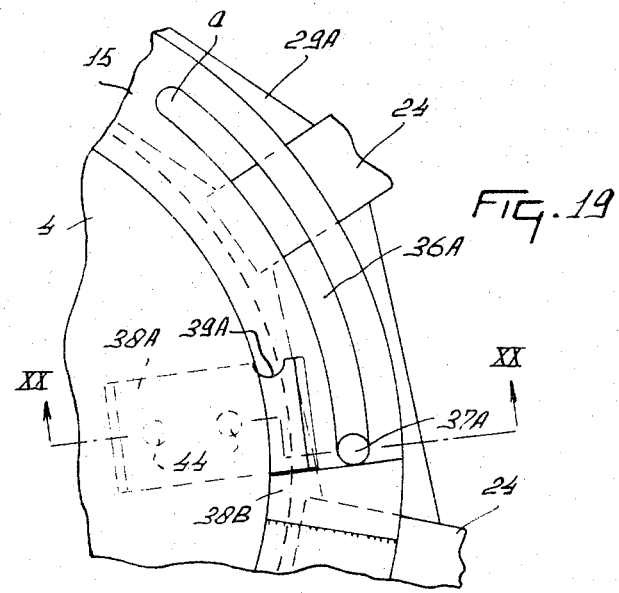

For a better understanding of the invention, and to show how the same may be carried into effect, reference will now be made, by way of example, to the accompanying drawings, in which:

FIG. 1 is a schematic plan view of an implement comprising two rake members embodying the invention, in a working position, FIG. 2 shows the same implement in an inoperative transport position, FIG. 3 is an enlarged plan view of a rake member, FIG. 4 is a section taken on the line IV—IV in FIG. 3, FIG. 5 is a plan view of the rake tines of the rake member of FIG. 3 in two operational positions, FIG. 6 is a plan view of a different construction of a rake member, in which the tines are coupled with each other, FIG. 7 is a plan view of a third embodiment of a rake member, in which a tine moving mechanism is arranged beneath tine-supporting arms, FIG. 8 is a section taken on the line VIII—VIII in FIG. 7, FIG. 9 is a plan view of an implement embodying the invention comprising one rake member, FIG. 10 is a plan view of a rake member comprising a spring for returning the tines to an inoperative transport position, FIG. 11 is a plan view of a rake member in which the tines are shifted outwardly into their working positions, FIG. 12 is a section taken on the line XII—XII in FIG. 11, FIG. 13 is a plan view of a rake member in which the tine moving mechanism comprises a slot and a coupling pin, FIG. 14 is a perspective view of the mounting of a swath board suitable for use in the implement shown in FIGS. 1 and 2, FIG. 15 shows two swath boards in an inoperative transport position, to a reduced scale, FIG. 16 is an enlarged partial cross-sectional view corresponding with the cross-sectional view of FIG. 4, FIG. 17 is a plan view of part of a further embodiment of one of the rake members of the implement, FIG. 18 is a vertical section substantially corresponding to FIG. 17 but also showing further parts of the implements, FIG. 19 is a plan view showing further details of parts that can be seen in FIG. 17, FIG. 20 is an enlarged sectional view showing further details of parts that can be seen in FIG. 18, FIG. 21 substantially corresponds to FIG. 17 but shows an alternative rake member construction, and FIG. 22 is an enlarged sectional elevation showing further details of the construction and arrangement of certain parts that can be seen in FIG. 21

The implement shown in FIGS. 1 and 2 comprises two rake members 1, which are adapted to rotate about upright vertically or substantially vertically extending axes afforded by shafts 2, in a direction as indication by the arrows A in FIG. 1. The rake members are connected to a frame beam 3, extending in the working position (FIG. 1) perpendicularly transverse to the direction of movement B; said beam accommodates a driving gear for the rake members in a manner to be described in detail hereinafter. Above each rake member a gear box 4 is provided, by means of which the associated rake member is driven. Gears in the gear boxes 4 are coupled to each other by means of a shaft 31 arranged in the frame beam 3 so that the driving force from one gear box can be transmitted to the other. One of the gear boxes comprises an input shaft (not shown in these Figures), which can be coupled with the aid of universal joints and an auxiliary shaft 5 with the power take-off shaft of a tractor 6, so that the rake members can be driven by means of the power take-off shaft of the tractor. The implement is supported in a known manner by ground wheels (not shown) arranged beneath the rake members.

The frame beam 3 is provided with a drawbar 7, which is coupled with the tractor so as to be freely pivotable. The drawbar 7 is adapted to pivot around a vertical shaft 8 relative to the frame beam 3 and, in known manner, it can be turned into either of two different positions relative to the frame beam 3. The implement may be provided at the rear with swath boards 9, which may be employed when the implement has to form swaths.

If the implement has to be used for spreading hay, these swath boards can be tilted upwardly as will be described in detail hereinafter. The rake members 1 are provided with tines 10, which project outwardly when the implement is in operation.

In operation, the implement has a very large working width, which is indicated in FIG. 1 by the reference C. The implement may be moved into the transport position shown schematically in FIG. 2. In this transport position the tines 10 are turned inwardly while, with respect to the frame beam 3, the drawbar 7 extends obliquely to the rear in the direction of movement B, it being advantageous for this purpose that the drawbar 7 should be located near one end of the frame beam 3.

In the new position, the drawbar 7 is locked in position relative to the frame beam 3 by a conventional locking member (not described in detail). Moreover, the swath boards 9 are tilted upwardly so that they are located on top of the implement. In this case the implement has a transport width D, which is materially smaller than the effective width C. The width D is less than 65 percent of the width C. The working width C is such that the implement can encompass three conventionally spaced mowing swaths so that said three mowing swaths can be spread simultaneously. The distance C may be about 360 centimeters or even more. One of the ground wheels arranged beneath the rake members and not shown herein may be a castor wheel, which comprises nevertheless a locking member so that it can be locked against a castoring movement in a position in which its axis of rotation extends parallel to the frame beam 3, whereas the other ground wheel can be locked in two positions, for example, in the position in which its axis of rotation is parallel to the beam 3 and in a position in which this axis encloses an angle with the beam. The implement can be moved in the working position wherein the frame beam 3 is arranged transverse to the direction of movement. In the transport position, the castor ground wheel of the foremost rake member is unlocked so that it operates as a castor wheel, whereas the ground wheel of the hindmost rake member can be adjusted into a new position in which it is essential parallel to the drawbar 7 and serves also in this case as a directional ground wheel. In the position in which the rake members spread the crop, the swath boards can be fixed in the position indicated by broken lines in FIG. 1 in order to prevent the crop from being displaced too far. In this position the distance between the outermost points of the swath boards 9 is preferably almost as large as the distance C. When the swath boards occupy the position indicated by solid lines, the implement can form a swath. In the transport position, the swath boards 9 are tilted upwardly and inwardly to an extent such that they are supported on the frame beam 3 and in which the boards are substantially parallel to this beam. This will be described more fully hereinafter with reference to FIGS. 14 and 15. The construction of the rake members itself will be described more fully with reference to FIGS. 3 to 5.

In this embodiment of FIGS. 3 to 5 parts corresponding with those of FIGS. 1 and 2 are designated by the same reference numerals.

The rake member 1 comprises a hub 11, which is freely rotatable on a shaft 12. The hub 11 has fastened to it a toothed rim 13 and a downwardly orientated ring 14, which is fastened on the top side to a ring 15, extending transversely of the shaft 12 and provided with a ring 16 transverse to the axis of rotation of the rake member on the lower side. The ring 16 is provided with eight arms 17, to the ends of which rods 18 are pivoted. The rods 18 are pivoted at their other ends to ears 19, which are secured by means of bolts 20 to an extension 21 of a group of tines 10. The group of tines 10 comprises two tines having each a helical portion 22, the ends of which form the extension 21. The tines 10 are freely turnable by their helical portions around one end 23 of an arm 24 and are held in place by means of a safety ring 25. The arms 24 are, in turn, fastened to a ring 26 which is enclosed between rings 15 and 16 and which is freely rotatable around the ring 14. The tines 10 have bent-over portions 27 at their ends, which portions are bent rearwardly viewed in the direction of rotation A of the rake member, while in plan they are at an angle E of not more than 25°, in this case about 15°, to the remaining part of the outwardly projecting tine portion and in this embodiment to a radial line. The downwardly directed portions 23 of the arms are at an angle F of not more than 35°, preferably about 20°, to the center line 28 of the rake member. The tines 10 extend in this embodiment substantially at right angles to the portion 23 of the arms 24, while in operation the center line 28 of the rake member is at an angle of not less than 65°, preferably an angle of about 75°, to the ground. The central shaft of the rake member is held in a bearing 29 of the gear box 4, which is rigidly secured to the frame beam 3. The toothed rim 12 is in mesh with a gear wheel 30 on the aforementioned shaft 31 which is journalled in the frame beam 3. The gear box comprises a second gear wheel 32, to which an input shaft 33 is secured. The shaft 33 can be coupled with the auxiliary shaft 5 (See FIG. 1). One of the arms 24 is provided with a stop 34, which is adapted to co-operate with a cam 36, adapted to rotate about a shaft 35 and arranged on one of the arms 17. The cam 36 is drawn by a spring 37 against a stop 38.

The implement operates as follows; when the implement is in the transport position, the tines 10 are tilted inwardly into the position indicated in FIG. 5 by broken lines. In this position (shown in FIG. 2) the rake members have a reduced diameter so that the device has a small working width. The implement can be moved into the working position, shown in FIG. 1, by turning the drawbar 7 with respect to the frame beam 3 so that the drawbar 7 is substantially perpendicular to the frame beam 3 and by adjusting the ground wheels supporting the rake members. When the implement is driven by means of the power take-off shaft of the tractor 6, a torque is exerted on the toothed rim 13 and hence on the hub 11, as a result of which the ring 14 starts to turn in the direction indicated in FIG. 3 by the arrow A, which corresponds with the direction of rotation of the rake member in operation. Since the ring 26 with the arms 24 is freely turnable about the ring 14, the ring 14 turns relative to the arms 26 and hence the arms 17 turn relative to the arms 24 so that, with the aid of the coupling rods 18, the ear 19 and the prolongations 21 of the tines 10, the tines themselves are turned about the prolongations 23 of the arms 24. This displacement continues until the cam 36 comes into contact with the stop 34, the tines being then in the position shown in FIG. 3 by solid lines. In this position the arms 17 and 24 are rotating in synchronism so that the tines remain in the outward position and the rake member is operative. When the toothed rim 13 is no longer driven, the freely rotatable portion of the arms 24 continues rotating in contrast to the portion of the arms 17, which is no longer driven, since the arms 24 with the projecting tines 10 have a considerably larger mass than the arms 17 with the coupling rods 18, due to which the tines automatically return into their transport position. In the position shown in FIGS. 1 and 3, the tines occupy the setting preferably used for spreading the crop. As an alternative, the tines may be turned simultaneously into a different working position, which is shown in FIG. 5. This may be achieved by turning the cam 36 about the shaft 35 so that the spring 37 holds this cam in a substantially tangential position and the cam bears on a stop 38 (see FIG. 5). In this case the turn of the arms 17 relative to the arms 24 is smaller than in the case described above; as a result the tines are turned through a smaller angle and the tines do not extend almost radially. This position of the tines may be particularly useful when the implement co-operates with the swath boards 9 of FIG. 1, arranged in the position shown in FIG. 1 with full lines, in order to form swaths.

It will be obvious that the cam 36 adapted to occupy two positions may be replaced by a cam of different shape. It is possible, for example, to use an element adapted to turn about a shaft 35 of an arm 17 and having three or more cams at different distances from said shaft. By turning this element about the shaft so that each tine a different cam is moved forwardly, the tines can be moved into different positions. This may be important if the machine has to work under completely different conditions. Light-weight crop may require a tine position differing from that suitable for heavy crop. Moreover, the displacement of the tines involves a different spreading effect, which may be important under other climatic conditions. If the machine has to operate in heavy wind, a different position of the tines, for example, a less radial position may be significant. The implement embodying the invention has various advantages. In the first place it is possible to move the tines rapidly from a working position into a transport position; in the second place the tines can be simultaneously moved from one working position into another working position; and in the third place, when the machine is towed, while the rake members are not rotating, the tines are prevented from penetrating into the ground by their tips, in which case the tines as well as the turf might be damaged.

In the embodiment described above, each group of tines comprising its own coupling rod 18, which is connected with the arm 17. It will appear from FIG. 6 that it is also possible to couple several tines with each other by means of a coupling rod 40, while only one or two arms 17 are coupled to the ears 19. The coupling rods 40 are preferably telescopic rods since, during the pivotal movement, the distance between the ears 19 slightly varies. Each telescopic rod comprises two halves 40A and 40B, the former being adapted to move in the longitudinal direction inside the latter, while it can be held in place by means of a spring (not shown).

In the embodiment shown in FIGS. 3, and 5, only one stop 34 is illustrated. As a matter of course, further arms 17 may be provided with such a stop so that the energy is transmitted not via one cam 36 and the stop 34 but via a plurality of cams and stops. Especially in this case it is advisable to arrange some resilient material at the places which come into contact with each other.

An advantage of the construction shown in FIGS. 3 to 5, is furthermore, that the setting members 17, 18 and 19 are located beneath the arms 24 so that they are not likely to come into contact with the crop. As an alternative, said setting members may be arranged above the arms 24, as will be apparent from FIGS. 7 and 8, which will be described hereinafter.

In the embodiment shown in FIGS. 7 and 8 parts corresponding with those of FIGS. 1 to 6 are designated by the same reference numerals. The device shown in said Figures comprises a hub 11, which is freely rotatable on a shaft 12 and which is provided on top with a toothed rim 13 that is in mesh with the gear wheel 32, which can be rotated via the input shaft 33 coupled with the auxiliary shaft 5. The hub 11 is provided with a ring 50 transverse to the shaft 12 and rigidly secured to the hub and having a plate 51 fastened to it, which is provided with arms 17, which corresponds with the arms 17 of the foregoing Figures. The arms 17 are linked by the coupling rods 18 to the ears 19A which are fastened to shafts 52 adapted to pivot in sleeves 53 of the arms 24. By means of a clamping bracket 54, the shafts 52 are provided with two tines 10 having helical portions 25. The fastening by means of the bracket 54 is such that the helical portions 25 cannot turn freely about the shafts 52; they are, however, capable of deflecting resiliently. The arms 24 are secured to a ring 55, which is freely rotatable around a downwardly orientated ring 56 and is held by a ring 57 extending transversely of the shaft 12 and secured to the ring 56. The rings 56 and 57 are rigidly secured to the plate 51. One of the arms 24 is provided with a cam 58, which extends substantially tangentially and is secured to the arm 24 by means of a locking pin 59 passed through the opening. The cam 58 has a second opening 60. During a turn of the rake member, the cam 58 is in contact with the cam 61 on one of the arms 17. By displacing the cam 58 the angular displacement of the arms 17 can be varied in the manner described above. It is then necessary to withdraw a pin 59 from the opening and to displace the cam 58 so that it can again be fastened by means of the locking pin 59 and the opening 60 to an arm 24. The plate 51 of this embodiment is secured to the ring 50 by means of two bolts 62 extending through a slot 63 in the plate 51. The plate 51 is arranged eccentrically to the center line 28. Also in this embodiment the ends 27 of the tines are bent over rearwardly in the direction of rotation indicated by the arrow A through an angle substantially corresponding with that of the foregoing Figures.

The device operates as follows: As with the device shown in the foregoing FIGS. 1 to 6, the tines 10 are approximately tangential in the transport position so that the rake member has the smallest circumference possible. When the rake member is driven via the gear wheel 32 and the toothed rim 13, the arms 17 are turned by the starting torque with respect to the arms 24 and the coupling rods 18 and the ears 19A located, in plan, above the arms 24 will pivot so that the shaft 52 in the sleeve 53 is pivoted and the tines are moved into the position shown in FIG. 7, while the arms 24 are rotated. When the rotation of the plate 50 is arrested, the arms 24 will continue rotating due to their inertia forces and the tines will be pivoted back into their transport position. The cam 58 can be displaced by arranging it on an arm 24 by means of the second opening 60, so that the arms 17 can turn through a smaller angle relative to the arms 24, the tines being then in a position as shown in FIG. 5. This may be important, as stated above, with respect to the various processes to which the crop has to be subjected. Moreover, it may be desirable for the rake tines to change their positions during one revolution so that the crop is readily disengaged from the tines. When, in operation, the implement is moved in the direction of the arrow F and the tines occupy their lowermost positions as shown on the lefthand side of FIG. 8, the tines have to withdraw from the crop subsequent to their lowermost positions and it may therefore be desirable to vary the tine positions. In known rake members this change of tine positions is accomplished by means of a fairly complicated cam structure, but the construction embodying the invention permits of performing the same in a simpler manner. The plate 51 is arranged, as stated above, eccentrically to the center line 28 of the shaft 12 so that when the plate turns with respect to the center line 28 the distance of the pivotal points of the coupling rods 18 with the arms 17 from the center line 28 is varied, as a result of which, in operation, the tines 10 perform a pivotal movement during each revolution, the crop being thus disengaged from the tines. The area where the crop is removed from the tines may be varied by slightly turning the plate 51 with respect to the ring 50 after the nuts 62 in the slots 63 are loosened. It is thus possible to disengage the crop from the rake tines in a simple and effective manner, which is particularly desirable when the implement comprises only one rake member and is employed for the formation of swaths. Such a device is shown in FIG. 9.

The implement is shown schematically; it comprises a rake member of the kind shown in FIGS. 7 and 8, which is arranged on a frame 65, which is coupled in known manner with the three-point lifting device or hitch of a tractor. The implement is supported from two ground wheels 66. The implement is, moreover, provided with a swath board 67, which is adapted to turn about a horizontal shaft 68, extending in the direction of movement B for moving the swath board into a position in which it is out of use on top of the implement. The tines 10 of the rake member are moved into the transport position in the manner described above, for example, with reference to FIGS. 7 and 8. Moreover, during the rotation about their axes, the tines change their positions during each revolution so that they can shake off the crop and do not carry it along so that a well-shaped swath is formed.

In the embodiment described in the foregoing, the return of the tines from the working position into the transport position is brought about by the inertia forces, as a result of which a movement between those two elements of the rake member is performed with controls the tines positions. In order to avoid the risk of nondisplacement of the tines, if the inertia forces were not sufficient under given conditions, it may be desirable to provide, as is shown in FIG. 10, a spring 69, which tends to return the arms 17 into their initial positions. The construction shown in this Figure corresponds with the structure shown in FIGS. 3 and 4 and corresponding parts are denoted by the same reference numerals. The spring 69 of this embodiment is a compression spring which surrounds a rod 69A that is pivotally connected to the ring 15 and slides in a bushing 69B which is pivotally connected to the arm 24. The spring is fully compressed when the rod 69A extends radially and is extended both in the working position as well as in the transport position of the tines 10. It should be noted that the spring shown in FIG. 10 may also be employed in the other embodiments.

All the embodiments described above comprise rake tines arranged in groups. As a matter of course, the tines may, as an alternative, be arranged individually on the arms 24. It should furthermore be noted that, in the above embodiments, each rake member comprises arms 24 holding the tines. Obviously the rake member may be provided in known manner with a felly connected in some way or other with the hub of the rake wheel, while the tines of the rake member are arranged in said felly.

It should furthermore be noted that, in the embodiments described in the foregoing, the tines 10 are adapted to pivot about shafts 23 and 52 respectively, extending transversely of the arms 24 and directed towards the ground. As an alternative, the shaft need not be directed to the ground, but can extend at least substantially parallel to the ground surface so that the tines are turned upwardly to attain the transport position instead of being pivoted laterally. Also in this case a coupling rod may be fastened to an extension of a tine as described above for the embodiments for the lateral turn of the tines. As an alternative, the tines do not turn about a shaft transverse of the arms; they shift from the transport position into the working position. This construction is shown schematically in FIGS. 11 and 12.

In this embodiment the rake member comprises a plurality of shafts 70, only one of which is shown. As described above, these shafts are fastened to a ring (not shown in FIG. 12) freely arranged in the rake member and corresponding with the ring 55. The arm 70 has a portion 71 directed towards the ground and having a sleeve 72 arranged on it.

An arm 73 is adapted to slide in the sleeve 72 in the direction of the shaft 28. The arm 73 has a helical groove 74 and the sleeve 72 has a pin 75 fitting in said groove.

The arm 70 is surrounded by a sleeve 76, which is adapted to slide to and fro on the arm 70 and which is provided with an extension 77 to which one end of the arm 73 is fastened so that the arm 73 can turn in an opening of the extension 77. The extension is enclosed between two pins 78. The sleeve 76 has pivoted to it a coupling rod 18, which is secured to an arm 17 of a ring 51.

The rake member comprises tines 78 which are directed towards the ground in the operational position and which are fastened to the arms 73 with the aid of helically wound portions 79 and bolts 80. The tines 78 are, in their topmost positions, substantially perpendicular to the ground.

The implement operates as follows. In the same manner as described with reference to the foregoing Figures, the arms 17 turn at the start of the machine from the position shown in FIG. 11 by broken lines into the position indicated by solid lines. Owing to this movement, the sleeve 76 is displaced with the aid of the coupling rod 18 into the position indicated by solid lines by its travel along the arm 70. This displacement causes the arm 73 to be moved outwardly by the extension 77, while at the same time the tines 78 are caused to move from the position indicated by broken lines into the position indicated by full lines. This displacement is performed as a result of the position of the pin 75 in the groove 74.

At the termination of the drive of the rake member, tha arm 17 is again displaced by inertia forces relative to the arm 70 into the position indicated by broken lines so that the tines 78 also are shifted back into the position shown in broken lines.

In this structure the diameter of the rake wheel is reduced, while simultaneously the tines are moved upwardly.

In the embodiments described above, coupling rods 18 are used. Thise coupling rods, though being advantageous, are not always necessary. The displacement of the two elements may bring about a displacement of the tines in other ways.

In the embodiment shown in FIG. 13, no coupling rods are provided; the arms 17 are provided with slots 90 in which pins 91 of the ears 19A are adapted to slide. In this embodiment parts corresponding with those of the embodiments shown in FIGS. 7 and 8 are designated by corresponding reference numerals. The dimension of the slot 90 is such that the arms 17 can turn into the two positions shown so that the tines can turn out of a practically tangential transport position into a practically radial working position and vice versa.

The swath boards 9 of FIGS. 1 and 2 may be placed in various positions in a simple manner as is shown in FIGS. 14 qnd 15. In these Figures parts corresponding with those of FIGS. 1 to 5 are designated by the same reference numerals. The swath boards 9 are provided with arms 100, which are linked via a fork 101 and a pivotal shaft 102 extending transverse to the arm to a sleeve 103 arranged rotatably on the shaft 2 of the main implement frame.

The implement comprises furthermore a ring segment 104 having recesses 105, 106 and 107, which are open on the top side. The shaft 102 is arranged, viewed from above, within the ring segment 104 and preferably near the sleeve 103. Thus, the swath boards 9 are arranged as close as possible to the tines of the raking members without touching the tines, during their movement around the shafts 102. The swath board has a tubular guide and a plurality of resilient bars 109 of alternately equal lengths.

In operation, the swath boards 9 bear on the ground by the guide 108 and are adapted to move up and down around the shaft 102 with respect to the frame so that they can follow the unevennesses of the soil. In the position in which the swath boards are used to form swaths (see FIG. 1 in full lines), the arms 100 are located in the recesses 106.

In the position in which each swath board 9 is used for preventing the crop from being displaced too far, for example, at the edge of a field (see FIG. 1, dotted lines), the arm 100 is located in the recess 105. When the arm 100 is turned out of the recess, the swath board can be displaced by turning the sleeve 103.

In the position in which the arm 100 has been turned to an extent such that it is located in the recess 107, the swath board 9 is in the transport position and bears on the beam 3 (see FIG. 2; see also the disposition of FIG. 15, in which the rear side of the implement with the swath boards in the transport position is shown). The recess 107 is located in a portion of the ring segment 104 which is higher than the further part. The ring segment 104 is, with the aid of a bolt 114, connected to the gear box 4 and is provided with a slit 115 through which the bolt 114 extends. The height of the ring segment 104 can be altered by loosening the bolt 114 and moving the ring in an upward and downward direction. The construction described above permits of moving the swath boards in a simple manner into the transport position. The construction has moreover the advantage that is gives many operating possibilities and is not expensive.

In FIG. 16 the parts of the detail corresponding with those of FIGS. 3 and 4 are designated by the same reference numerals. The arms 24 are arranged on the ring 26, which is adapted to turn about the ring 14. The ring 14 has fastened to it the arms 17. The ring 14 together with the ring 15 is arranged on the hub 11, to which the toothed rim 13 is also secured. In order to avoid excessive friction during the turn of the ring 26, forming one element, around the ring 14, forming the other element, four rings 110, 111, 112 and 113 are provided, which provide a satisfactory guide; these rings may be made of bronze or of some other bearing material, for example, a synthetic resin.

Reference will now be made to FIGS. 17 to 20 of the drawings which show the construction and arrangement of one of the rake members 1 in greater detail. In this embodiment parts corresponding with FIGS. 1–6 are designated by the same reference numerals. The rake member has a hub 11 which is freely rotatable about the upwardly extending axis 28 of an upright shaft 12 affording that axis. The hub 11 incorporates an upwardly facing toothed rim 13 and an annular element or annulus 14 which incorporates a cylindrical portion 15A (FIG. 20) whose central axis of curvature is substantially coincident with the axis 28. The bottom of the cylindrical portion 15A is integrally connected to a flange portion 16 the greater part of which is contained in a plane that is substantially perpendicular to the axis 28. The upper edge of the cylindrical portion 15A of the annular element or annulus 14 is bent over inwardly so as to extend substantially parallel to the flange portion 16 and is secured by bolts to a ring 15 and to the overlying hub 11. The flange portion 16 has eight outwardly and downwardly projecting arms 17 secured to it which arms are spaced apart from one another at regular 45° intervals around the axis 28. The outer free ends of the arms 17 are pivotally connected to the ends of crank rods 18 whose opposite ends are pivotally connected to lugs 19 forming parts of plates that are secured by bolts 20 to extensions 21 of corresponding tines 10. It will be seen from FIGS. 17 and 18 of the drawings that the tines 10 are, in fact, formed in integral pairs from single lengths of spring steel wire or rod, the two tines of each pair each including a helically wound coil 22 and the two coils 22 being integrally interconnected by a loop which forms part of the corresponding extension 21 and which is thus indirectly secured to the corresponding lug 19 by a pair of the bolts 20. Each group of tines 19 is turnable about the axis of an end portion 23 of a corresponding spoke 24 by way of its helical coils 22, the tines being prevented from becoming axially detached from the spoke ends 22 by means of rings 25 that are fastened to the spoke ends 23 between the corresponding coils 22 by transverse pins.

There are eight spokes 24 and they are secured to a generally annular element 27A having a cylindrical portion 28A (FIG. 20) that substantially concentrically surrounds the cylindrical portion 15A of the annulus 14 and also a larger upper flange portion 29A and a lower smaller flange portion 30A, said portions 29A and 30A both being contained in planes that are substantially perpendicular to the axis 28. The annulus 14 that is linked to the tines 10 by the rods 18 and the generally annular element 27A that is linked to the tines 10 by the spokes 24 are turnable relative to one another about the axis 32. Bearing material is arranged between the cylindrical portions 15A and 28A of the annulus 14 and the annular element 27A and between the flange portion 16 of the annulus 14 and the lower smaller flange portion 30A of the annular element 27A. The bearing material is conveniently a synthetic resin or other plastics material and, in the embodiment which is being described, is afforded by a plurality of uniformly spaced caps or buttons 30B that are made for instance of nylon and that are fastened to the appropriate portions of the generally annular element 27A.

The free end of each tine 10 takes the form of a bent-over portion 27 which is inclined rearwardly with respect to the direction A relative to the remainders of the tines. As seen in plan view, angles of not more that 25° are enclosed between the longitudinal axes of the portions 27 and those of the remainders of the tines 10. In the embodiment which is being described, the angles which have just been mentioned have values of substantially 15°. The longitudinal axes of the spoke ends 23 are inclined to the axis of rotation 28 by an angle of not more than 35° and it is preferred that said angle should have a magnitude of substantially 20°. As can be seen in FIG. 18 of the drawings, the tines 10 are inclined at angles of substantially 90° to the axes of the spoke ends 23. The upwardly extending axis of rotation 28 of each rake member 1 is inclined to the horizontal during the operation of the implement by an angle which should not be less than 65° and which it is preferred should have a magnitude of substantially 75°. The shafts 12 that afford the axes of rotation 28 are secured in sleeves 29 of the corresponding gear boxes 4 and it will be realised that drive is transmitted from one gear box 4 to the other by toothed pinions (not shown) that are in mesh with the corresponding toothed rims 13 and that are fastened to the opposite ends of the aforementioned rotary shaft that extends internally of the frame beam 3. One of the two gear boxes 4 houses a toothed bevel pinion 32 that is mounted at the internal end of the aforementioned rotary input shaft 33 with its teeth in driving mesh with those of the corresponding rim 13. The input shaft 33 has an outwardly projecting splined or otherwise keyed end which can be placed in driven connection with the power take-off shaft of the tractor 6 or some other operating vehicle by way of the aforementioned telescopic transmission shaft 5 having universal joints at its opposite ends.

The ring 15 is provided with a guide in the form of an arcuate slot 36A whose center of curvature is coincident with the corresponding axis of rotation 28. A pin 37A secured to the upper larger flange portion 29A of the generally annular element 27A is entered upwardly through the slot 36A and affords an extension of said generally annular element 27A. A portion of the length of the guide slot 36A can be blocked off and thus rendered ineffective by a strip-shaped stop 38A formed at one edge with a substantially semicircular recess 39A arranged to receive the pin 37A when said stop 38A is in an effective blocking position. As can be seen best in FIG. 20 of the drawings, the stop 38A is longitudinally displaceable (i.e., in a substantially radial direction with respect to the axis 28) alongside a support 38B (FIG. 19) fastened to the ring 15 between a radially inner ineffective position (shown in full lines in FIG. 20) and a radially outer blocking position (shown in broken lines in FIG. 20). A retaining member 40A is provided to maintain the stop 38A in either one of the two positions which have just been mentioned, said locking member 40A comprising a ball 43A located in the mouth of a bore 41A of the corresponding hub 11 under the action of a helical compression spring 42A that is contained in the bore 41A and which tends to urge the ball 43A downwardly out of said bore. The strip-shaped stop 38A is formed with two relatively spaced holes or recesses 44A either one of which can be placed in register with the larger diameter ball 43A which will then be urged downwardly into that hole or recess 44A whereafter the stop 38A will be retained in the corresponding position until positive manual displacement thereof re-compresses the spring 42A and allows the stop to be moved to its alternative position.

When the raking implement that has been described is in the transport position thereof that is illustrated in FIG. 17 of the drawings, the tines 10 of the two rake members 1 are turned inwardly about the spoke ends 23 as compared with their working positions. These inwardly tilted positions of the tines 10 are also shown by regularly broken lines in FIG. 17 of the drawings. When the implement is to be brought to a working position, the drawbar 7 is turned about the pivot 8 relative to the frame of the implement until said draw bar extends approximately perpendicular to the frame beam 3 as shown in FIG. 1 of the drawings. The ground wheels (not shown) of the implement which support its rake members 1 are also adjusted to bring them to appropriate positions with respect to the direction B. As soon as rotary drive is applied to the input shaft 33, a torque is exerted upon the toothed rims 13 and upon the hubs 11 that are integral with them. The result is that each annulus 14 (which is bolted to the corresponding hub 11) tends to be turned in the direction A (FIG. 17) about the corresponding axis 28 (FIG. 18). Since each annulus 14 is linked to the tines 10 by the cranked rods 18, and since the nylon caps or buttons 30B readily allow each annulus 14 and each generally annular element 27A to turn relative to one another about the corresponding axis 28, each annulus 14 and its arms 17 turn relative to the spokes 24 so that the rods 18 turn each pair of tines 10 about the corresponding spoke end 23 in a direction opposite to the direction A as seen in FIG. 17 of the drawings.

The tines 10 continue to turn about the spoke ends 23 until the pin 37A, which is simultaneously moving along the slot 36A away from the end a thereof comes to rest in the recess 39A of the stop 38A which stop will, under these circumstances, occupy the radially outer position thereof that is shown in broken lines in FIG. 20 of the drawings. The circumstances which have just been described are also shown in FIG. 17 of the drawings from which it will be seen that, under these circumstances, the tines 10 are turned about the spoke ends 23 into the positions that are shown in full lines in the same Figure. These positions of the tines 10 are generally the most satisfactory for operations in which hay or other crop is to be tedder or spread at random across a field. If, as an alternative, the stop 38A is placed in the radially inner position thereof that is shown in FIG. 19 of the drawings and in full lines in FIG. 20 thereof, said stop becomes ineffective and the pin 37A can move along the whole of the length of the slot 36A from the end a thereof to the position shown in FIG. 19 of the drawings. Under these conditions, the tines 10 are turned further about the spoke ends 23 and reach substantially the positions shown in irregularly broken lines in FIG. 17 of the drawings in which, as seen in a direction parallel to the corresponding axis 28, they are disposed substantially radially with respect to that axis. This position of the tines is generally to be preferred for operations in which the hay or other crop is to be collected into swaths or windrows. The nylon or other plastics caps or buttons 30B that are disposed between the cylindrical portions 15A and 28A of the annular element or annulus 14 and the generally annular element 27A and also the caps or buttons 30B that are disposed between the flange portions 16 and 30A of said elements 14 and 27A constitute effective and cheap bearings that readily allow relative movements of the elements 14 and 27A to take place while nevertheless providing some resistance to such movements so that relative displacement occurs smoothly and so that there is little, if any, tendency for the tines 10 to move outwardly into undesirable settings when the implement is arranged in its inoperative transport position. Since the portions 15A and 16 of the element 14 and the portions 28A and 30A of the element 27A are both substantially perpendicularly inclined to one another, there are bearing surfaces that will resist forces acting in both substantially horizontal and substantially vertical directions.

In FIGS. 21 and 22 of the drawings are parts corresponding with those of FIGS. 17–20 nominated with corresponding reference numerals. These Figures illustrate a modification of the rake members 1 in which two stops 45A are provided on the ring 15 at an angular distance apart from one another around the corresponding axis of rotation 28 of substantially 90°. The guide slot 36A is formed in the ring 15 between the two stops 45A and is arcuately curved around the corresponding axis of rotation 28 and subtends an angle of substantially 50° at that axis. The extension pin 37A is rigidly secured to the upper larger flange portion 29A of the generally annular element 27A and projects upwardly through the slot 36A. An arcuately curved plate 46A is disposed between the two stops 45A and is formed with a slot 47A that overlies the guide slot 36A in the ring 15 but that does not coincide throughout the whole of its curved length with said slot 36A. A transverse bore is formed adjacent the upper end of the extension pin 37A and a "safety" pin 48A of a generally known construction which includes a resilient retaining ring is entered through said bore to hold the plate 46A in place. Upon removing the "safety" pin 48A, the plate 46A can be inverted and replaced on top of the ring 15 so that an alternative portion of the underlying slot 36A is effectively blanked off. As shown in FIG. 22 of the drawings, the plate 46A occupies a position in which the extension pin 37A can move along the slot 36A in a direction opposite to the direction A away from the guide end a to a position at the extreme opposite end of the slot 36A. The pin 37A is, in fact, shown in FIG. 21 as occupying the position just mentioned. The tines 10 are shown in a corresponding angular setting about the spoke ends 23 which setting corresponds to that shown in irregularly broken lines in FIG. 17, such setting being preferred for the formation of swaths and windrows. Upon inversion of the plate 46A, the slot 47A will coincide with the portion of the underlying slot 36A that is shown in broken lines in FIG. 21 while the opposite end of said slot 36A will be rendered ineffective by the overlying slot 47A that is of a lesser angular extent. Thus, during the use of the implement, the pin 37A cannot move along the slot 36A so fas as is shown in FIG. 21 and will come to rest against the end of the slot 47A at a position in which the tines 10 will have angular settings about the spoke ends 23 that substantially correspond to the settings thereof that are shown in full lines in FIG. 17 of the drawings. It will be remembered that this setting is preferred for tedding and random spreading of hay and other crops. Both the stop 38A that has been described above and the invertible plate 46A form part of means by which the tines 10 can be moved from one position (i.e., in this case, an inoperative transport position) to either one of two further positions which, in this case, are a tedding position and a raking or swath-forming position.

Although not so far described or illustrated, the means by which the tines 10 can be moved from one position to either of two further positions can also be employed in cases in which the tines 10 are substantially directly coupled together in some way. Under such circumstances the pairs or other groups of tines 10 may be moved from their initial inoperative transport or other starting position by forces other than a starting torque, for example, by centrifugal force. It will be realised that the tines 10 will normally tend to return to the inoperative transport positions thereof that are shown in FIG. 2 of the drawings and in regularly broken lines in FIG. 17 of the drawings when drive to the rotary input shaft 35A is discontinued since the inertia of the element 27A and the spokes 24 will cause them to tend to continue in rotation thus bringing the extension pin 37A back towards the end *a* of the guide slot 36A with a corresponding angular displacement of the tines 10 about the spoke ends 23. If the tines 10 do not return automatically to their inoperative inwardly withdrawn positions to a sufficient extent, the necessary relative movement of the elements 14 and 27A can be brought about manually both quickly and easily.

Although various features of the crop displacing implement that has been described and/or illustrated in the accompanying drawing will be set forth in the following claims as inventive features, it is emphasised that the invention is not necessarily limited to those features and that is emcompasses within its scope all of the parts of the implement that has been described and/or illustrated in the accompanying drawings both individually and in various combinations.

What we claim is:

1. A raking implement for the displacement of crop lying on the ground, comprising a frame and at least one rake member rotatably mounted on an upwardly extending shaft supported on said frame, said rake member having radial arms by tines pivotably secured adjacent the outer portions of said arms and said arms being operatively associated with driving means for rotation, said arms being interconnected with two rotatable and relatively displaceable elements located adjacent said shaft, said driving means including a first of said elements, the second element being linked with the first element through pivot connections to said tines, whereby, the torque of rotation displaces said elements with respect to one another and pivots said tines from one position to another, stop means on said rake member to limit the relative displacement of said elements with respect to one another.

2. An implement as claimed in claim 1, wherein said first element is an annular guide with its center of curvature being substantially coincident with said shaft.

3. An implement as claimed in claim 2, wherein said second element is a ring that is connected to said guide.

4. An implement as claimed in claim 3, wherein said annular guide includes a slot which subtends an angle of substantially 50° at the axis of rotation of said rake member and said second element moves along said slot.

5. An implement as claimed in claim 4, wherein the relative movements of said two elements is controlled by limiting means and said limiting means is a stop whereby a portion of said guide slot can be blocked.

6. An implement as claimed in claim 5, wherein said stop is displaceable relative to said guide in a substantially radial direction relative to said shaft.

7. An implement as claimed in claim 6 wherein said second element has an extension and said stop has a recess shaped to receive said extension.

8. An implement as claimed in claim 7, wherein said stop is displaceable in a direction substantially parallel to its own length and is associated with a retaining mechanism which fixes said stop in either of two position.

9. An implement as claimed in claim 8, wherein said retaining mechanism comprises a spring-loaded member having an at least partly spherical surface that cooperates with either one of two holes in said stop.

10. An implement as claimed in claim 7, wherein said limiting means comprises a plate that has slot means and which can be inverted 180° to vary the effective length of said guide and change the effective position of said guide relative to said shaft.

11. An implement as claimed in claim 10, wherein said extension normally projects through said slot means in the plate and has a releasable pin to retain the plate in an appointed position when the pin is in engagement with said extension.

12. An implement as claimed in claim 1, wherein said two elements are annular and concentrically mounted with respect to one another, the adjacent portions of said elements being connected by synthetic resin bearing material.

13. An implement as claimed in claim 12, wherein two relatively inclined portions of a first element are arranged to cooperate with two relatively inclined adjacent portions of the other element through said bearing material.

14. An implement as claimed in claim 13, wherein said relatively inclined portions of said elements are inclined to one another at substantially 90°.

15. An implement as claimed in claim 13 wherein the bearing material is in the form of buttons.

16. An implement as claimed in claim 15, wherein said buttons are spaced apart from one another at regular intervals.

17. An implement as claimed in claim 12, wherein one of the relatively inclined portions of each element extends substantially parallel to the axis of rotation of said rake member and each of the other relatively inclined portions extends substantially perpendicular to said axis.

18. An implement as claimed in claim 1, wherein said tines are biased by a spring to return to an initial non-working position.

19. A raking implement for the displacement of crop lying on the ground, comprising a frame and a plurality of interconnected rake members mounted on upwardly extending axis shafts supported on said frame, at least one swath board being pivotably connected by an arm to one of said axis shafts which coincides with the center line of its respective rake member, the pivotal connection of each swath board including a support with means that limits the lateral movements of said board, each swath board being pivotable from a working position to an inoperative transport position, the pivotal connection of each swath board including a support to limit the lateral movements of said boards.

20. An implement as claimed in claim 19, wherein there are two swath boards pivotably connected to said axis shafts.

21. An implement as claimed in claim 20, wherein said swath boards are pivotable into two alternative working positions, and one of said working positions is located to define the greatest distance between said two swath boards which approximately equals the overall width of the implement.

22. An implement as claimed in claim 20, wherein, in the transport position, said swath boards are positioned substantially parallel to a frame beam interconnecting said rake members.

23. An implement as claimed in claim 20, wherein, in the transport position, said swath boards are pivoted to locations above a frame beam interconnecting said rake members.

24. An implement as claimed in claim 20, wherein said support is circular with recesses in its upper edge and each rake member is mounted on an arm that is movable to any one of said recesses around the axis shaft of the respective rake member.

25. An implement as claimed in claim 24, wherein said recesses correspond to at least one working position and a transport position.

26. An implement as claimed in claim 25, wherein each swath board is turnable about a substantially horizontal axis and movable in upward and downward directions, said axis being located closer to the axis shaft of the respective rake wheel than the rim of said support.

27. An implement as claimed in claim 26, wherein the connection of each swath board to the axis shaft of a rake member includes a pivot bushing which is turnably connected to the axis shaft of a rake member, a second pivot connection being secured in said bushing.

28. An implement as claimed in claim 27, wherein each swath board has a lower guide beam which bears against the ground during operation.

29. An implement as claimed in claim 28, wherein part of the swath board which is foremost viewed in the direction of travel is situated near the circular path traced by rotating of the tines of said rake members in their outermost positions.

30. An implement as claimed in claim 25, wherein said support is vertically adjustable along its axis shaft.

31. An implement as claimed in claim 19, wherein each rake member includes a partly circular part on its axis shaft and said part has downwardly extending arms which are coupled to supports for tines.

32. An implement as claimed in claim 19, wherein said swath board has spring tines of varying lengths extending substantially parallel to one another and a frame beam interconnects the axis shafts of the raking members and in the transport position the tines of said swath board extend substantially parallel to said frame beam.

33. A raking implement for the displacement of crop lying on the ground, comprising a frame and at least one rake member rotatably mounted on said frame and supported on an upwardly extending axis, driving means connected to said rake member, and tines being turnably supported on said member, said tines being drivenly coupled to an element on which the driving torque is exerted, said element, with the tines, being displaceable with respect to the remainder of said rake member, and said element being mounted on said rake member to displace independently of the rotation of said rake member in response to the torque exerted by said driving means of the rake member, whereby said element and tines are displaced and moved with respect to the remainder of said rake member, said tines being turned from one position into another position during rotation.

34. An implement as claimed in claim 33, wherein said tines are moveable from a transport position into a working position during rotation.

35. An implement as claimed in claim 33, wherein said element is located around the axis of symmetry of the rake member and is rotatably mounted on said member to be turnable around its own axis.

36. An implement as claimed in claim 33, wherein said element is coupled to a tooth-wheel means that forms a part of said driving connection.

37. An implement as claimed in claim 36, wherein said tines are coupled with the element by rod means.

38. An implement as claimed in claim 37, wherein each of said tines are connected to said element with a rod of said rod means.

39. An implement as claimed in claim 33, wherein said rake member includes stop means for limiting the relative movement of said element with respect to the remainder of said raking member.

40. An implement as claimed in claim 39, wherein the extent of the movement of said element with respect to the remainder of the raking member is adjustable with adjusting means associated with the driving means whereby said tines can be set in different positions.

41. An implement as claimed in claim 40, wherein a stop of said stop means for limiting the relative movement of said element is secured to said rake member.

42. An implement as claimed in claim 41 wherein said stop is adjustably mounted for setting the tines in different positions.

43. An implement as claimed in claim 33, wherein said element is biased by a spring to return to an initial non-working position.

44. An implement as claimed in claim 33, wherein said element is directly connected to said driving means for moving the tines from a first position to a second position and said driving means is mounted to cause a periodical displacement of said tines during each revolution of said rake member.

45. An implement as claimed in claim 44, wherein said element is generally circular and eccentrically mounted around the shaft which affords the axis of rotation of said rake member, said element being rotated by said driving means about said axis whereby, during each revolution, said tines are displaced from one position.

46. An implement as claimed in claim 45, wherein said element is adjustably mounted on said shaft to vary the magnitude of effect of rotational torque of said rake member.

47. A raking implement for the displacement of crop lying on the ground, comprising a frame, and at least one rake member rotatably mounted on said frame, said member being supported on an upwardly extending axis shaft and being connected to driving means for rotation, said rake member comprising radial arms with tines on support means turnable mounted with respect to said shaft, an adjusting member being displaceable relative to the remaining part of the rake member due to an increase or decrease of torque exerted by said driving means, said adjusting member being linked with pivotal supports of said support means and said tines to automatically move same from one position to another position, said adjusting member including fixing means to secure same in different settings relative to the remaining part of the raking member to vary the magnitude of movement of the tines from one position to another.

48. An implement as claimed in claim 47, wherein said adjusting member is circular and eccentrically mounted around said shaft.

49. An implement as claimed in claim 48, wherein the axis of said adjusting member is adjustable in a direction parallel to the center line of said rake member.

50. An implement as claimed in claim 47, wherein there are two rake members mounted on shafts supported on said frame.

51. An implement as claimed in claim 47, wherein said tines are in groups and each arm has a group of tines connected to a support on said arm, said support being pivoted to said arm.

52. An implement as claimed in claim 47, wherein said tines are biased by a spring to return to an initial non-working position.

* * * * *